May 7, 1957     C. F. CALHOUN     2,791,157

RADIAL PROFILE MILLING MACHINE

Filed July 2, 1954     3 Sheets-Sheet 1

INVENTOR.
CLIFFORD F. CALHOUN

BY

ATTORNEY

May 7, 1957  C. F. CALHOUN  2,791,157
RADIAL PROFILE MILLING MACHINE
Filed July 2, 1954  3 Sheets-Sheet 2
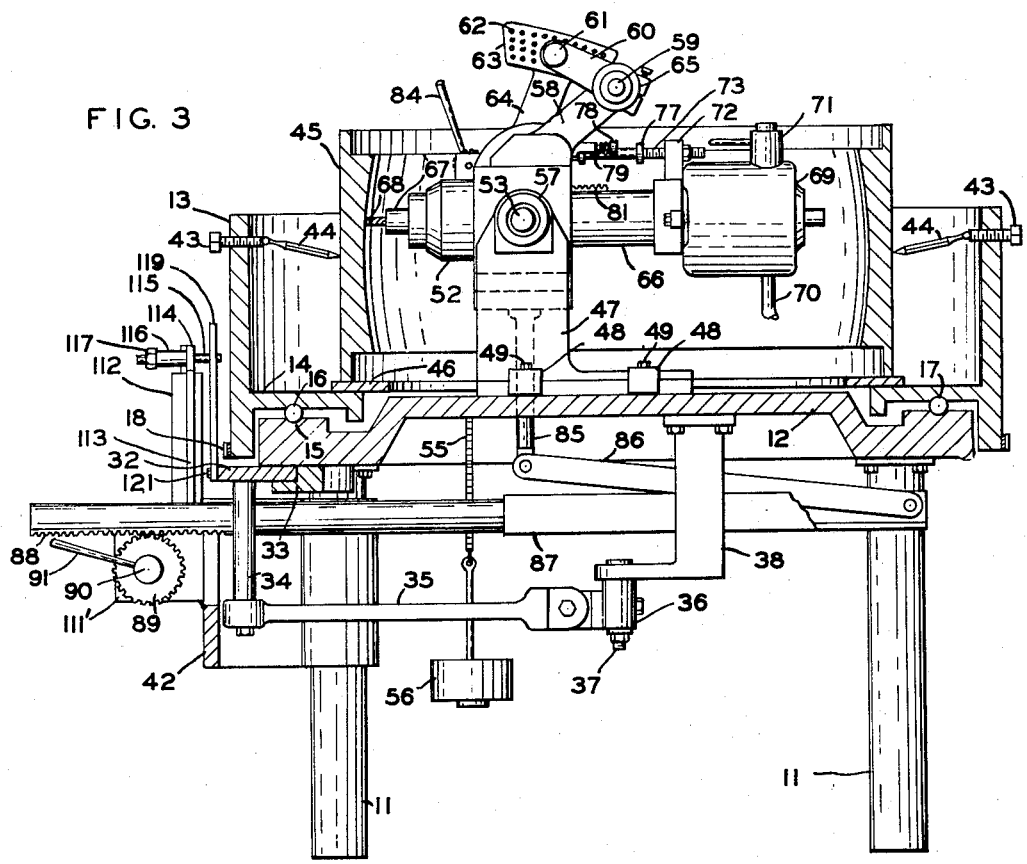
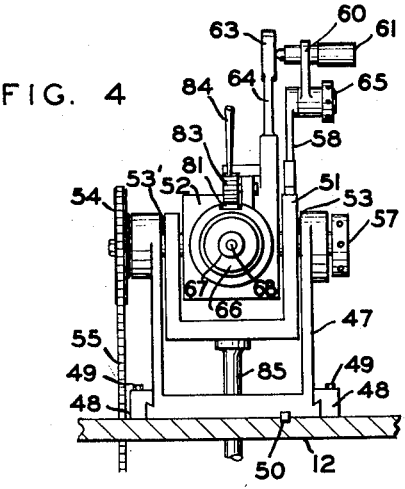
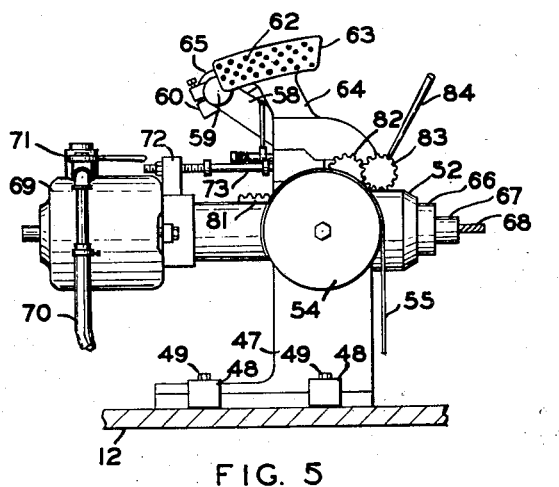
INVENTOR.
CLIFFORD F. CALHOUN
BY
ATTORNEY May 7, 1957 C. F. CALHOUN 2,791,157
RADIAL PROFILE MILLING MACHINE
Filed July 2, 1954 3 Sheets-Sheet 3
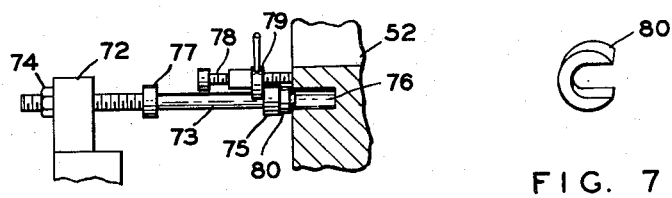
FIG. 6
FIG. 7
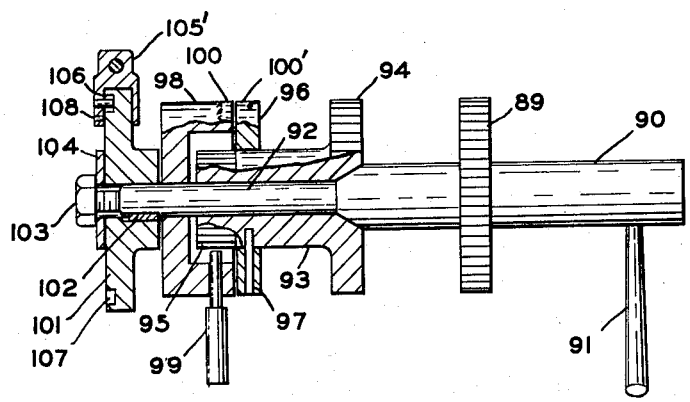
FIG. 8
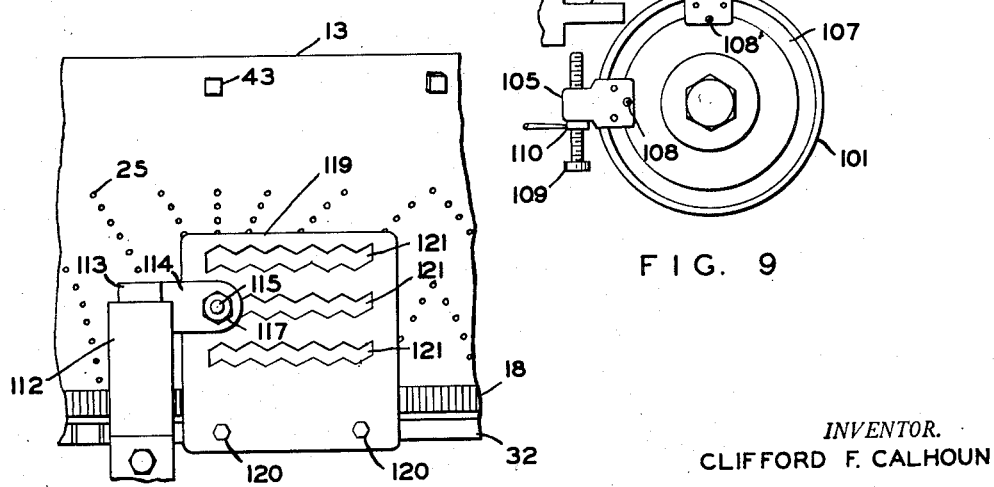
FIG. 9
FIG. 10
INVENTOR.
CLIFFORD F. CALHOUN
BY
ATTORNEY

2,791,157
RADIAL PROFILE MILLING MACHINE

Clifford F. Calhoun, Macon, Ga.

Application July 2, 1954, Serial No. 440,961

11 Claims. (Cl. 90—13.7)

This invention relates to radial profile milling machines and more particularly to a matrix routing machine which engraves or routs out the desired configuration on the inner periphery of matrix which may be adapted to be utilized in the recapping of automobile tires and the like.

In the art of recapping pneumatic tires, the periphery of the tire carcass is first ground down whereby a rough uniform surface remains to which glue and a strip of semi-cured rubber is applied. To form the finished recapped tire, the tire carcass is next placed in a mold where heat and pressure is applied specifically to the semi-cured rubber and cement, thereby causing the rubber to become fluid for a sufficient time to conform to the shape of the matrix in the mold and thereafter solidify in this form as a curved continuous ring firmly adhered to the tire carcass.

Because balance is an important feature of any modern tire, care should be taken to provide a matrix for the mold which has uniformly spaced valleys and ridges around the inner periphery of the matrix. To this end, I have provided a routing machine to form the inside configuration with such uniformity that a superior tire matrix results.

Briefly, my automotive tire matrix routing machine is a device which receives annulus having the inner periphery concaved in the general shape of an automotive tire. This annulus from which the tire matrix is formed is chucked concentrically in place within an indexing ring. The indexing ring is free to be rotated by an indexing crank; however, a template or pattern plate which has the design proportioned to an increment of the annulus may be locked to travel with the ring and may be relocated at predetermined spacings along the ring when desired. A scribe adapted for vertical movement only is positioned to ride within the template and upon rotation of a router control handle may be moved up or down within the template. The router control handle is geared and linked to a router in the center of the machine so that the rotating end mill of the machine may be moved up or down in an arc as the router is pivoted about a horizontal axis. Also there are means on the machine for controlling the initial positioning of the end mill and the depth of cut of the same.

Accordingly, it is an object of my invention to provide a radial profile milling machine wherein the inside configuration of a tire matrix may be quickly, easily and efficiently routed out.

Another object of my invention is to provide a radial profile milling machine which will form a configuration on a portion of an annulus and repeat this configuration along the remainder of the periphery until a uniform continuous configuration is formed.

Another object of my invention is to provide a radial profile milling machine which will efficiently and accurately provide arcuate configuration of identical shape along the inner periphery of an annulus, said machine being capable of operation by one person.

Another object of my invention is to provide a radial profile milling machine which is economical to manufacture and efficient to operate, a machine capable of providing a superior matrix.

Another object of my invention is to provide a radial profile milling machine wherein by simple adjustment a vast variety of configurations may be routed into a matrix annulus and the spacing of the configuration may be varied.

Another object of my invention is to provide a radial profile milling machine which is adapted to form configurations in various diameter matrix annuli.

Other and further objects and advantages of my invention will become apparent from the following description when taken in conjunction with the accompanying drawings wherein like characters of reference designate corresponding parts throughout the several views, and wherein:

Fig. 3 is a cross-sectional view taken along line 3—3 in Fig. 2.

Fig. 4 is a front elevational view of a detail showing the router of the machine illustrated in Fig. 1.

Fig. 5 is a side elevational view of the router illustrated in Fig. 4.

Fig. 6 is a fragmentary view of the depth control mechanism of the router illustrated in Fig. 4.

Fig. 7 is an isometric view of the insert of the depth control mechanism illustrated in Fig. 6.

Fig. 8 is a partially broken fragmentary view of the router control gear assembly and travel limiting mechanism of the machine illustrated in Fig. 1.

Fig. 9 is a view of a detail showing a portion of the vertical tool travel limiting mechanism.

Fig. 10 is a fragmentary view of a detail of the machine illustrated in Fig. 1 showing the copy plate and stylus thereof.

Figure 1:
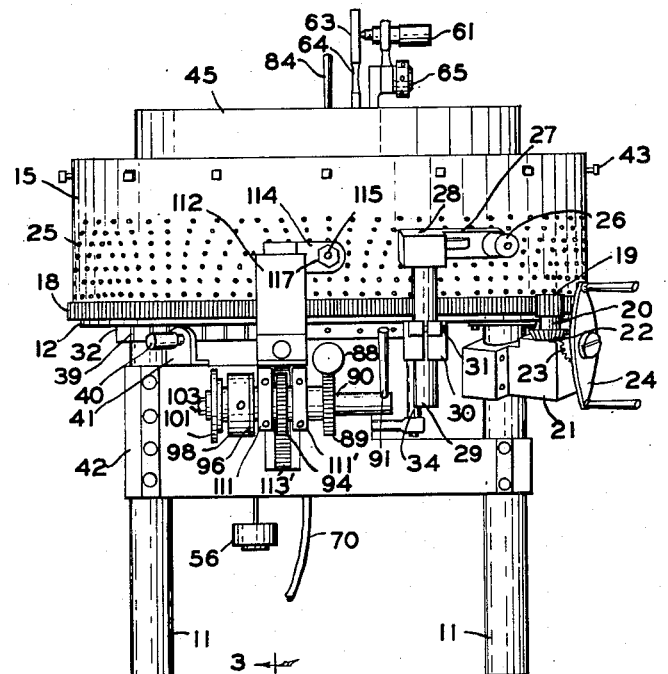
Fig. 1 is a side elevational view of a machine constructed in accordance with my invention.

Referring now in detail to the embodiment chosen for purpose of illustration, numeral 11 denotes the legs of my machine which support a stationary circular platform 12. On platform 12 is mounted the router with indexing ring 13 surrounding it.

Indexing ring assembly

The indexing ring 13 is a hollow cylindrical member of which the inside diameter is larger than the outside diameter of platform 12 so that it may be rotated around platform 12. For support a shoulder 14 projects inwardly from the lower inner periphery of indexing ring 13 to overlap the edge of platform 12. The upper surface of the edge of platform 12 is provided with an annular groove 15 while a complementary groove 16 is provided in the lower surface of shoulder 14 to form races which receive ball bearings 17. It is thus apparent that indexing ring 13 projects above platform 12 and is freely rotatably thereon.

To rotate indexing ring 13, a continuous circular rack 18 is provided along the lower outside edge of indexing ring 13 and the same meshes with pinion 19 which is carried by an upstanding stub shaft 20 journaled in block 21 which is fixed to one of legs 11 as shown in Fig. 1. Adjacent block 21, stub shaft 20 is provided with a beveled gear 22 which, in turn, meshes with a second beveled gear 23 fixed to indexing crank 24. Thus, upon rotation of crank 24, indexing ring 23 will be rotated.

In Figs. 1 and 10, it will be seen that a plurality of holes 25 are provided along spaced horizontal planes in the outer periphery of indexing ring 13. These holes 25 are arranged along spaced horizontal planes and in each plane holes 25 are equidistant from each other;

however, for each successive horizontal plane the holes 25 are graduated in spacing so that holes 25 along the upper plane are wider apart than holes 25 along the lower plane.

*Copy plate positioning assembly*

Adapted to project into any one of holes 25 is a spring loaded index locating pin 26 which is carried by arm 27 mounted on block 28. An upright standard 29 carries block 28 and, in turn, is adjustably fixed in clamping member 30 so that upon loosening of bolt 31 on clamping member 30 standard 29 may be raised or lowered to a position whereby indexing pin 26 may project into any one of holes 25 which is adjacent it in that horizontal plane. Each band has a different number of holes divisible by an even number so as to get the pitch desired.

Clamping member 30 is fixed to one end of an arcuate copy plate carrying member 32 positioned immediately below but not fixed to rack 18. As best seen in Fig. 3, the inner edge of member 32 is slidably positioned in retaining brace 33 fixed to platform 12 and is prevented from moving outwardly by a supporting rod 34 which projects downwardly from member 32 to connect with one end of radius arm 35 whose other end is connected to a journal 36 pivotally carried by a center pin 37, the center pin being fixed to bracket 38 which projects down from the lower central portion of platform 12. Center pin 37 is centered beneath platform 12 and hence template carrying member 32 which is pivoted thereto, as described, will pivot concentrically with indexing ring 13 through a limited arc.

Now it will be seen that with dowel pin 26 in place in one of the holes 25, copy plate carrying member 32 is rotatably locked with indexing ring 13; and that, upon removal of dowel pin 26 from the hole, indexing ring 13 may be rotated to a new position where dowel pin 26 will project into another one of the holes 25 in a horizontal plane with the previous hole. It is apparent that by selection of the proper horizontal plane for dowel pin 26, substantially any predetermined spacing between successive settings of copy plate carrying member 32 may be effected.

*Indexing ring locking assembly*

In using my machine, it is often desirable to lock the indexing ring with respect to platform 12, and hence a portion of copy plate carrying member 32 is provided with spaced vertical V-shaped channels 39 which are adapted to receive the end of a normally disengaged stopping pin 40 carried by an upstanding bracket 41. Bracket 41 is fixedly mounted on an arcuate control assembly supporting plate 42 which, in turn, is fixed by its ends to legs 11 as shown in Fig. 1. Plate 42 is generally concentric with platform 12 and is positioned below the same. It is thus seen that upon engagement of pin 40 in one of the channels 39, and with pin 26 engaged in one of holes 25, indexing ring 13 is fixed with relation to platform 12, and that upon disengaging pin 40 the indexing ring may be rotated and pin 40 engaged in another of the channels 39.

*Matrix form securing means*

Figure 2:
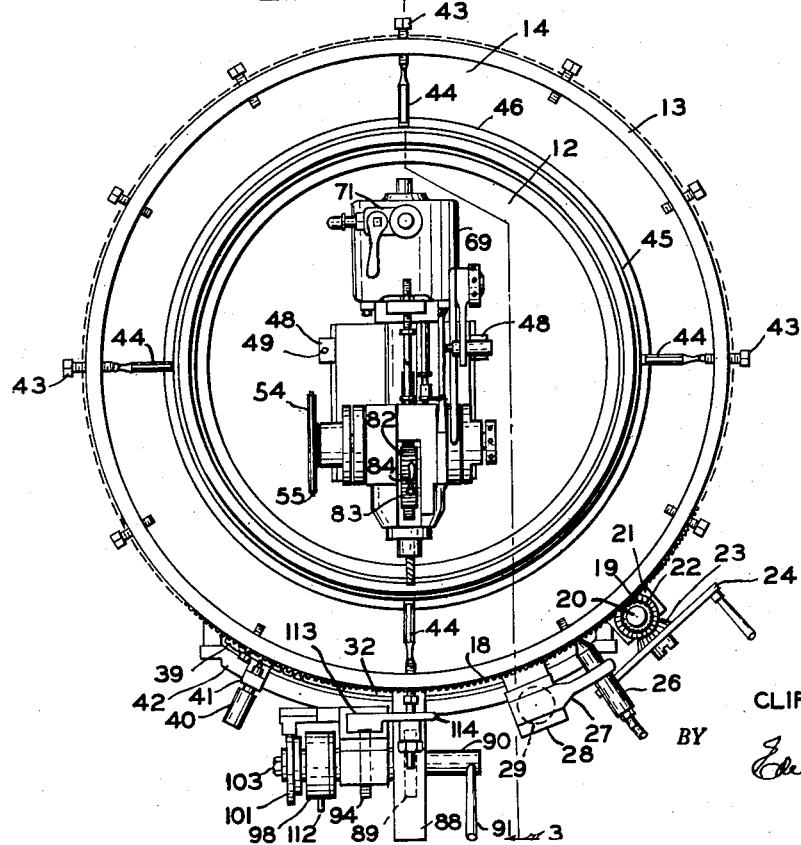
Fig. 2 is a top plan view of the machine shown in Fig. 1.

From an examination of Figs. 1, 2 and 3, it will be seen that bolts 43 are arranged at spaced intervals around the upper edge of indexing ring 13 to project radially through the same. Each of bolts 43 is concaved at its inner end to receive respectively the knobbed end of one of chucking fingers 44. The other end of each chucking finger 44 is provided with a chisel point whereby these points may be urged into the outer periphery of a preformed matrix annulus 45 to center the same and hold it securely in place.

As best seen in Fig. 3, annulus 45 rests upon a mounting ring 46 on shoulder 14 which ring may be replaced by other mounting rings of varying thickness, thereby spacing the annulus 45 the proper distance above shoulder 14, the shoulder and ring forming a supporting means therefor.

It is obvious that by tightening or loosening bolts 43, the annulus 45 may be shifted until it is concentrically held in place to be acted upon by the router.

*Router assembly*

As best seen in Figs. 3, 4 and 5, the router assembly is mounted in the center of platform 12 and comprises an upstanding yoke 47 which is provided with a flat base resting on platform 12. Lugs 48 which are dovetailed to yoke 47, as shown in Fig. 4, are secured to platform 12 by bolts 49 to provide a means of adjustably securing yoke 47 in place. In addition, complementary keyways are provided in platform 12 and the base of yoke 47 to receive a key 50. It is now seen that by loosening bolts 49, yoke 47 may be repositioned radially on platform 12. Normally, however, once the router is centered, its position on the platform would not be changed.

Within yoke 47 is a second and smaller yoke 51, and within yoke 51 is router housing 52. Trunnions 53, 53', which are fixed connected to housing 52 and project from the sides thereof through yoke 51, are journaled by yoke 47. The end of trunnions 53' is provided with sprocket 54 which, in turn, is provided with an engaging chain 55 having a weight 56 for counter-balancing. A friction disc 57 threadably engages trunnion 53 so that as the same is tightened, it will engage the side of yoke 47 to prevent rotation of housing 52. In normal use, however, disc 57 will not engage yoke 47 and thus housing 52 is free to pivot about the transverse axis of trunnions 53, 53'.

To adjustably link yoke 51 and housing 52 together for purposes to be described hereinafter, an arm 58 projects upwardly from yoke 51 and its free end is provided with a horizontally projecting stub shaft 59 which pivotally receives one end of link 60 thereon. The other end of link 60 is provided with a spring loaded positioning pin 61 adapted to project into one of a plurality of apertures 62 on a router positioning plate 63 carried by an arm 64 projecting up from housing 52. It is now apparent that the angle between the router housing 52 and yoke 51 may be changed by relocating pin 61 in a different one of apertures 62. A cap 65 threaded onto the end of stub shaft 59 may be tightened to lock link 60 with respect to arm 58.

*Router*

Slideably retained within the center of housing 52 is the router which includes a sleeve 66 rotatably retaining a spindle 67. Spindle 67 is provided at its outer end with a collet which receives the end mill 68 which end mill accomplishes the work on annulus 45. Spindle 67 is rotated by power means on sleeve 66 such as air motor 69, the air for rotation of motor 69 being supplied from an external compressor (not shown) through hose 70 and valve 71. As best seen in Fig. 6, to cooperate with the router is a depth control mechanism including a depth gauge supporting member 72 mounted on sleeve 66 to threadably receive one end of a rod or depth gauge 73. Depth gauge 73 projects parallel to spindle 67 and is adapted to be locked in place by lock nut 74 while the other end of depth gauge 73 is provided with a peripheral shoulder 75 which limits the distance, which depth gauge 73 may project into an aperture 76 in housing 52. A second peripheral shoulder 77 located centrally on depth gauge 73 limits the distance that depth gauge 73 may be screwed into supporting member 72.

Adapted to cooperate with depth gauge 73 is a locking piece which comprises a bolt 78 rotatably mounted to housing 52 adjacent depth gauge 73. Threadably retained by bolt 78 is a stop lever 79 which may be pivoted over depth gauge 73 to a position ot be engaged by shoulder 75. As shown in Figs. 6 and 7, a removable insert 80 of predetermined thickness is adapted to fit over depth gauge 73 between shoulder 75 and housing 52; the thickness of this insert 80 determines the depth of cut of the end mill 68 as will be described hereinafter.

In Figs. 3, 4 and 5, it will be seen that a rack 81 is provided along the top of sleeve 66 and this rack meshes with an idler gear 82 which, in turn, meshes with a driving cog 83 provided with lever 84. Both idler gear 82 and driving cog 83 are rotatably mounted on housing 52, and hence upon rotation of lever 84 sleeve 66 will be moved in housing 52, thereby moving end mill 68 toward or away from annulus 45.

To set the proper depth for end mill 68, the end of the same is brought to touch the inside periphery of annulus 45, then insert 80 is inserted on depth gauge 73, as shown in Fig. 6. Next, lock nut 74 is loosened and the depth gauge rotated to adjust the effective length of the same until the shoulder 75 urges insert 80 against housing 52. Thereafter, insert 80 may be removed and stop lever 79 rotated until it engages depth gauge 73. Upon starting the motor 69, end mill 68 may be urged into annulus 45 by movement of lever 84; and, when peripheral shoulder 75 engages housing 52, bolt 78 may be rotated until it is against shoulder 75, thus locking it in place and thus locking end mill 68 at its proper operating depth.

Router control assembly

As mentioned herein before, the router is adapted to pivot on trunnions 53, 53' and is normally linked to yoke 51. To control the tilting of yoke 51 and thereby control the vertical movement of the router about its horizontal axis, I have provided a tilting arm 85 which is rigidly fixed to the bottom of yoke 51 and projects below platform 12. The lower end of tilting arm 85 is pivotally connected to one end of a connecting link 86, the other end of which is pivotally connected to one end of control shaft 87. The other end of control shaft 87 is circular and is provided with a plurality of teeth 88 which form a rack meshing with and riding on control gear 89.

It is now apparent that upon rotation of gear 89, the router will be rotated in one direction or the other about trunnions 53, 53' and thus end mill 68 will be moved up and down in an arc. It is to be remembered however that to shift the general position of the router with respect to the position of gear 89, pin 61 may be relocated in another of holes 62.

As seen most clearly in Fig. 8, gear 89 is fixed to control axle 90 which is a cylindrical shaft provided with control handle 91 at one end and is tapered at the other end to form control shaft extension 92. A collar 93, having a stylus control pinion 94 at one end and splines 95 at the other, is journaled on extension 92 and has a complementary tapered section which is adjacent the tapered portion of control shaft 90. A circular vernier plate 96 is received on the central portion of collar 93 and fixed to the same by a pin 97.

Fixed to extension 92 is a spline cover member 98 which abuts plate 96 and through which a spline engaging pin 99 extends to retractably engage splines 95. Vernier scales 100, 100' respectively provided adjacent each other on the peripheries of member 98 and plate 96 provide a means for determining the relative position of gear 89 with respect to pinion 94.

At the end of extension 92 is a travel limiting mechanism including a rotation limiting disc 101 which is keyed to extension 92 by key 102 and is retained in place thereon by a cap screw 103 provided with washer 104. Disc 101 is provided with a pair of limiting fingers 105, 105' slideably retained thereon by groove followers, such as groove follower 106 which rides in groove 107. Fingers 105, 105' are adapted to be fixed in place by set screws 108, 108' respectively. Limiting bolts 109, 109' project generally toward each other and are respectively carried by fingers 105, 105' and they are respectively provided with lock nuts 110, 110', as shown in Fig. 9.

As best seen in Figs. 1 and 2, the gear assembly shown in Fig. 8 is supported by a pair of brackets 111, 111' with bracket 111 journaling collar 93 and bracket 111' journaling that portion of axle 90 between gear 89 and pinion 94. Brackets 111, 111' are supported by plate 42; and mounted on top of brackets 111, 111' is an upstanding stylus rack supporting member 112 within which a stylus rack 113 is slideably retained to mesh with pinion 94 at its lower end and carry a stylus supporting flange 114 at its upper end. A stylus 115 projects through a bushing 116 carried by flange 114 and extends toward indexing ring 13. Stylus 115 is adapted to be locked in place by lock nut 117.

It will now be seen that upon movement of lever 91 to rotate shaft 90, gear 89 and pinion 94 are rotated to respectively move the router and stylus 115 in synchronization; hence, end mill 68 is rotated about trunnions 53, 53' as stylus 115 is moved.

Also carried by supporting member 112 is projection 118 which cooperates with limiting bolts 109, 109' to limit the arc of rotation of shaft 90. Projection 118 extends between limiting bolts 109, 109', as shown in Fig. 9.

As shown in Figs. 3 and 10, a copy plate 119 is mounted by bolts 120 to member 32 and projects upwardly to be engaged by stylus 115. For convenience of illustration, I have not shown copy plate 119 in Figs. 1 and 2. This copy plate 119 is provided with a plurality of openings 121 which define the shape of the engraving to be done on annulus 45 to form a matrix. Of course, these openings 119 may be varied to provide the proper pattern to be followed.

Operation

When my radial profile milling machine is to be placed in operation, annulus 45 is chucked in place and centered with respect to the router vertical axis. Then the height of standard 29 is adjusted for index locating pin 26 to be on the proper plane for predetermined spacing whereby it may extend into one of holes 25 on indexing ring 25. Next, indexing ring 25 is indexed by crank 24 until the copy plate 119 is aligned with stylus 115. Thereafter, control handle 91 is rotated until stylus 115 is aligned with one of the openings 121, as shown in Fig. 10, and projects thereinto, as shown in Fig. 3.

After the foregoing operations have been accomplished, insert 80, of predetermined thickness to define the depth of cut of end mill 68, is installed on depth gauge 73 and the gauge adjusted by rotating it while operating lever 84 until end mill 68 just touches annulus 45 as insert 80 is urged by peripheral shoulder 75 against housing 52. The insert 80 may then be removed, motor 69 started and lever 84 rotated to move sleeve 66 carrying end mill 68 the predetermined distance into annulus 45. Then lock lever 79 is rotated to abut peripheral shoulder 75 and tightened thereagainst by rotation of bolt 78.

The machine is now ready for routing or engraving; by manipulation of control handle 91 in conjunction with crank 24, it is readily seen that stylus 115 may be made to follow the outline of opening 121, since the copy plate 119 travels with indexing ring 13. After one of openings 121 has been followed by stylus 115, end mill 68 is retracted by first rotating stop lever 79 and then rotating lever 84. Thereafter, handle 91 may be manipulated until stylus 115 is aligned with another opening 121, the stylus 115 and end mill 68 respectively engaged as described above. Of course, with vertical openings in copy plate 119 instead of horizontal openings, as shown in Fig. 10, crank 24 should be manipulated to align the next opening with stylus 115.

After all openings 121 have been followed by stylus 115, end mill 68 is retracted, pin 26 relocated in a subsequent hole 25 and the operation repeated. It is to be remembered that relocating pin 26 in another hole 25, repositions pattern plate 119 with respect to indexing ring 13 and thus the entire inner periphery of annulus 45 is accessible to end mill 68.

Manipulation incidental to operation

By positioning pin 61 in a proper aperture 63, a certain portion, say the upper half of annulus 45, may be engraved or routed out and by relocation thereof, another portion, say the lower half of annulus 45, may be engraved or routed out.

To fix annulus 45 with respect to platform 12 for special routing of annulus 45 in a vertical direction only, pin 40 may be engaged in one of valleys 39 which, because index locating pin 26 is engaged in one of holes 25, will prevent indexing ring 13 from being rotated.

To prevent the end mill 68 from being rotated out of engagement with annulus 45, limiting bolts 109, 109' may be adjusted by either rotating these bolts within fingers 105, 105' for fine adjustment or loosening bolts 108, 108' to shift fingers 105, 105' for rough adjustment.

To adjust the position of stylus 115 with respect to the general position of end mill 68, independent of pin 63 and aperture 62, pin 99 which normally engages splines 95 may be retracted therefrom and the position of cover 98 adjusted with respect to plate 96, thereby relocating the relative angular positions of gear 94 with respect to gear 89. After proper adjustment, pin 99 may be re-engaged between splines 95 to thus link the two together.

From the foregoing detailed description, it is obvious that I have provided a highly efficient machine which is easily adaptable to widely varying designs for tire matrixes, and since each segment of the matrix is exactly duplicated around the entire inner periphery of annulus 45, a far superior tire matrix is provided.

Equally obvious to those skilled in the art is that many variations may be made in the single embodiment chosen for purpose of illustration without departing from the scope of my invention as defined by the appended claims.

I claim:

1. In a profile milling machine, an annulus on which work is accomplished, and milling means positioned adjacent thereto, said milling means having an axis substantially intersecting the axis of said annulus, said milling means also being movable toward and away from said annulus for engagement and disengagement therewith and rotatable about its axis for cutting engagement with said annulus, said milling means in addition being movable in a plane passing through the axis of said annulus and pivotal about a transverse axis intersecting the axis of said annulus to traverse at least a portion of the periphery of said annulus; and means for imparting relative movement between said annulus and said milling means about the axis of said annulus.

2. In a profile milling machine, an annulus on which work is accomplished, said annulus having a central axis, means for rotating said annulus with respect to said central axis, milling means arranged adjacent said annulus, and means for actuating said milling mens for cutting engagement with said annulus, said milling means being movable about an axis substantially perpendicular to and intersecting said central axis.

3. In a profile milling machine wherein milling means is arranged to engrave the inner periphery of an annulus, means for rotating said annulus about an axis, and means within said annulus for pivoting said milling means substantially midway within said annulus about an axis substantially perpendicular to and substantially intersecting said first mentioned axis.

4. In a vertical profile milling machine for routing out the inner periphery of an annulus, a platform, indexing means rotatably mounted on said platform, means for chucking an annulus in said indexing means, and a router mounted on said platform within said indexing means to rout out the inner periphery of said annulus, said router being adapted to pivot about a transverse axis and said indexing means being adapted to index said annulus about an axis intersecting said transverse axis.

5. In a profile routing machine having a router and means for controlling said router, a yoke carrying said router, a smaller yoke within said first mentioned yoke and connected to said control means, means for pivoting said router within said yokes, a plate fixed to said router, an arm projecting from said smaller yoke, a pin pivotally linked to said arm, said pin being adapted to project into one of a plurality of apertures in said plate to adjustably fix the arcuate position of said router with respect to said smaller yoke.

6. In a profile milling machine, a router pivotally mounted for movement about a transverse axis, means for supporting said router, an arm connected to said router for controlling the movement of said router, a template remote from said router and connected to a member on which work is to be accomplished by said router, a scribe adapted to engage said template, control means connected to said scribe and to said arm for simultaneously controlling the movement of said scribe and said router, and means for moving said template and said member in synchronization.

7. In a profile milling machine wherein a scribe follows a template to control the movement of a router, the combination of a rack carrying said scribe, a pinion meshing with said rack, a gear meshing with teeth on a control shaft linked to said router, means for adjustably fixing said gear and said pinion together for simultaneous rotation, and means for limiting the movement of said gear to thereby limit the movement of said router.

8. In a radial profile milling machine wherein a scribe follows a template to control the movement of a router, an indexing means which controls the movement of a member on which work is accomplished by said router, said indexing means being adapted to travel along a predetermined path and being provided with a plurality of holes arranged in parallel planes along the surface of the same, the holes in each individual plane being equally spaced from each other, the spacing between holes in separate planes being graduated to provide graduated increments of spacing, and a dowel pin linked to said template, said dowel pin being adjustable to be positioned in any one of said planes to project into any one of said holes in that plane to synchronize the movement of said template with said indexing means for simultaneous movement with said member over an increment of travel of said indexing means and being adapted to project into successive holes in that plane to shift the location of said template with respect to said indexing means.

9. The structure as claimed in claim 8 wherein said router is pivoted about a transverse axis and said indexing means is a ring circumscribing said router.

10. A radial profile milling machine comprising a platform, an indexing ring surrounding said platform, means rotatably supporting said indexing ring with a portion thereof above said platform, chucking means on said indexing ring for centering and retaining a matrix annulus, a router adjustably positioned within said ring in a position for the end mill of said router to vertically engrave a portion of the inner periphery of said annulus, means on said platform pivotally supporting said router for rotation about a transverse axis, control means connected to said router to control the pivoting of said router, indexing means controlling the rotation of said indexing ring, a template connected to said indexing ring for selective rotation with said indexing ring, means for relocating said template with respect to said indexing ring, a movable scribe adjustable to ride in said template, movement of said scribe being controlled by said control means for simultaneous vertical movement in synchronization with the pivoting of said router, means for repositioning said router with respect to said control means, means for limiting the movement of said control means to thereby limit the movement of said router, and adjustable means on said router controlling the depth of cut of said end mill.

11. A radial profile milling machine comprising a platform, an indexing ring surrounding said platform, a peripheral flange projecting inwardly from the inner periphery of said indexing ring, said flange riding on said platform to support said indexing ring with a portion thereof above said platform, chucking means on said indexing ring for centering and retaining a matrix annulus, a router adjustably centered within said ring in a position for the end mill of said router to vertically engrave a portion of the inner periphery of said annulus, a yoke mounted on said platform and pivotally supporting said router for tilting movement about a transverse axis, control means connected to said router to contol the pivoting of said router, indexing means for controlling the rotation of said indexing ring, a template carried by said indexing ring for simultaneous rotation with said indexing ring, means for relocating said template with respect to said indexing ring, a scribe adapted to ride in said template, said scribe being controlled by said control means for simultaneous vertical movement in synchronization with the pivoting of said router, means for repositioning said router with respect to said control means, means for limiting the movement of said control means to thereby limit the movement of said router, and adjustable means on said router for controlling the depth of cut of said end mill.

References Cited in the file of this patent
UNITED STATES PATENTS

| | | |
|---|---|---|
| 1,481,381 | McClellan | Jan. 22, 1924 |
| 1,673,987 | Nesbitt | June 19, 1928 |
| 2,026,487 | Williams | Dec. 31, 1935 |